US008044615B2

(12) United States Patent
Shoda et al.

(10) Patent No.: US 8,044,615 B2
(45) Date of Patent: Oct. 25, 2011

(54) METHOD FOR CONTROLLING AC LINEAR MOTORS, DEVICE FOR DRIVING AC LINEAR MOTORS, AND SYSTEM OF AC LINEAR MOTORS

(75) Inventors: Kazuo Shoda, Tokyo (JP); Yoshifumi Nagato, Tokyo (JP)

(73) Assignee: THK Co., Ltd., Tokyo (JP)

( * ) Notice: Subject to any disclaimer, the term of this patent is extended or adjusted under 35 U.S.C. 154(b) by 432 days.

(21) Appl. No.: 12/443,277

(22) PCT Filed: Sep. 27, 2007

(86) PCT No.: PCT/JP2007/068766
§ 371 (c)(1),
(2), (4) Date: Mar. 27, 2009

(87) PCT Pub. No.: WO2008/038695
PCT Pub. Date: Apr. 3, 2008

(65) Prior Publication Data
US 2010/0072924 A1    Mar. 25, 2010

(30) Foreign Application Priority Data

Sep. 29, 2006  (JP) ................................. 2006-268804

(51) Int. Cl.
*H02K 41/00* (2006.01)
*H02P 7/00* (2006.01)
(52) U.S. Cl. .................. 318/135; 310/12.01; 310/12.13; 310/12.15
(58) Field of Classification Search .................. 318/135; 310/12.01, 12.13, 12.15
See application file for complete search history.

(56) References Cited

U.S. PATENT DOCUMENTS

| 4,853,602 A * | 8/1989 | Hommes et al. ................. 318/38 |
| 2005/0052144 A1 | 3/2005 | Matsubara et al. |
| 2011/0109252 A1* | 5/2011 | Takagi .......................... 318/135 |

FOREIGN PATENT DOCUMENTS

JP    10-52025 A    2/1998
(Continued)

OTHER PUBLICATIONS

International Search Report of PCT/JP2007/068766, Mailing Date of Dec. 18, 2007.

(Continued)

*Primary Examiner* — Thomas Dougherty
(74) *Attorney, Agent, or Firm* — Westerman, Hattori, Daniels & Adrian, LLP (57) ABSTRACT

Provided is a method for controlling a plurality of AC linear motors of identical specifications which are connected each other and operated synchronously so that they appear to operate as a single linear motor having desired power.

The method for controlling, as an AC linear motor set, a plurality of AC linear motors of identical specifications which are connected to each other, includes the steps of firmly connecting the AC linear motors in such a manner that pole pitches of movers of the AC linear motors and pole intervals of adjacent movers are identical; and setting any one of the AC linear motors to be a master AC linear motor and using a command signal generated based on a feedback signal of the master AC linear motor and current difference information obtained by comparing phase current of the master AC linear motor with phase current of another AC linear motor to control the AC linear motor set.

11 Claims, 8 Drawing Sheets

FOREIGN PATENT DOCUMENTS

| | | | |
|---|---|---|---|
| JP | 2001-2207 | A | 1/2001 |
| JP | 2003-284388 | A | 10/2003 |
| JP | 2004-23954 | A | 1/2004 |
| JP | 2004-24877 | A | 1/2004 |
| JP | 2005-86918 | A | 3/2005 |
| JP | 2006-19777 | A | 7/2006 |
| JP | 2002-191163 | A * | 7/2011 |

OTHER PUBLICATIONS

English Translation of the International Written Opinion of the International Searching Authority (Form PCT/ISA/237) of International Application No. PCT/JP2007/068766, having a filing date of Sep. 27, 2007.

* cited by examiner

METHOD FOR CONTROLLING AC LINEAR MOTORS, DEVICE FOR DRIVING AC LINEAR MOTORS, AND SYSTEM OF AC LINEAR MOTORS

TECHNICAL FIELD

The present invention relates to a method for controlling a plurality of AC linear motors of identical specifications (identical in coil characteristics, input/output characteristics and the like) which are connected to each other and operated synchronously so that the AC linear motors having desired power (thrust) appear to operate as a single linear motor, and to a device for driving such AC linear motors ("linear motor driving device") and a system thereof.

BACKGROUND ART

Linear motor actuators heavily used in various tables of machine tools, moving parts of industrial robots, various transfer apparatuses and the like have functions of giving linear movement to a moving member such as a table and stopping the moving member at a predetermined position. As their driving means, there are used AC linear synchronous motors, AC linear induction motors and the like (hereinafter referred to as linear motors). Such a linear motor is structured to have excitation coils of copper wire wounded on a stator or a mover and energize the excitation coils with exiting current to cause driving power, thereby enabling linear movement.

The power required for the linear motor is determined by the speed and weight of a stage moved by the linear motor. Meanwhile, there are easily available linear motors, which are manufactured under given standards and sometimes do not meet the requirement for desired power. In addition, when the required power is increased, there is a need to design and develop a new linear motor driving device that meets the requirement for increasing power. As the required power is greater, more time and effort are required in development of linear motor driving device and there are many technical problems to be solved.

As to a linear motor device for driving a plurality of linear motors simultaneously, there are following publications. The linear motor driving device disclosed in the publication 1 is a device for synchronously driving two linear motors arranged approximately in parallel, in which device an excitation current required for power generation is generated based on instructions from outside and the generated excitation current is output to each of the linear motors thereby to drive the two linear motors synchronously.

However, this technique is of the linear motor driving device for synchronously driving two linear motors of different specifications, which is different from the present invention relating to the technique of connecting a plurality of linear motors of identical specifications and controlling them as a single linear motor having desired power.

The publication 2 discloses the technique of simultaneously controlling plural linear motors by use of one driver and one linear scale, the linear motors each being for moving an embroidery frame in the x axis direction or y axis direction and the linear motors being externally connected to each other after segmentation of total power. In the publication 2, the plural linear motors are controlled by one driver and one linear scale in such a way that six leads of three-phase winding coils of moving blocks of the linear motors are extended to the outside to connect the plural linear motors to each other externally. Hence, this is different from the present invention which aims to connect a plurality of linear motors of identical specifications and control them as a single linear motor having desired power.

As described above, there is nothing disclosed as to the technique of combining plural linear motors manufactured for general purpose use as standard products to achieve desired power and controlling them to operate like a single linear motor.

[Patent Document 1] Japanese Patent Application Laid-open No. 2003-284388
[Patent Document 2] Japanese Patent Application Laid-open No. 2004-024877

DISCLOSURE OF THE INVENTION

Problems to be Solved by the Invention

Then, the present invention has an object to provide a method for controlling a plurality of AC linear motors of identical specifications (identical in coil characteristics, input/output characteristics and the like) which are connected to each other and operated synchronously so that they appear to operate as a single linear motor having desired power (thrust), and a device for driving such AC linear motors (linear motor driving device) and a system thereof.

Means for Solving the Problems

A first aspect of the present invention is a method for controlling, as an AC linear motor set, a plurality of AC linear motors of identical specifications which are connected to each other, comprising: firmly connecting the AC linear motors in such a manner that pole pitches of movers of the AC linear motors and pole intervals of adjacent movers are identical; and setting any one of the AC linear motors to be a master AC linear motor and using a command signal generated based on a feedback signal of the master AC linear motor and current difference information obtained by comparing phase current of the master AC linear motor with phase current of another AC linear motor to control the AC linear motor set. This makes it possible to combine plural AC linear motors manufactured under fixed specifications into an AC linear motor set having desired power.

It is preferable comparison of the phase currents is comparison of current profiles by an operational amplifier and a comparator and the current difference information is a difference ratio of the current profiles. As the current profiles are compared, it becomes possible to monitor the state of each connected AC linear motor with high accuracy thereby making sure to prevent burnout of the AC linear motor or the like.

It is preferable that the AC linear motor set is controlled with voltage difference information obtained by comparing a primary line voltage of a driving current supply part for supplying excitation current to coils of the master AC linear motor and a primary line voltage of another driving current supply part. This enables double protection of the AC linear motors. Further, it is preferable that the feedback signal contains an average of the primary line voltages of the driving current supply parts.

Another aspect of the present invention is a system having a plurality of AC linear motors of identical specifications which are connected to each other and controlled as an AC linear motor set, comprising: the AC linear motors being firmly connected each other in such a manner that pole pitches of movers of the AC linear motors and pole intervals of adjacent movers are identical; and an AC linear motor driving device having driving current supply parts provided corresponding to the respective AC linear motors for supplying excitation current to coils of the AC linear motors, a protecting/monitoring part containing a current comparator for comparing phase currents of the AC linear motors and a control command part for generating a command signal to output the signal to the driving current supply parts based on a signal generated by the protecting/monitoring part and a feedback signal from a master AC linear motor when one of the AC linear motors is set to the master AC linear motor.

It is preferable that the protecting/monitoring part further includes a voltage comparator for comparing primary voltages of the driving current supply parts. It is preferable that the current comparator has an operational amplifier and a comparator. Further, it is preferable that the voltage comparator has a unit for obtaining an average of primary line voltages of the driving current supply parts and supplying the average as the feedback signal to the control command part.

Another aspect of the present invention is a device for driving a plurality of AC linear motors of identical specifications which are firmly connected each other in such a manner that pole pitches of movers of the AC linear motors and pole intervals of adjacent movers are identical to control the AC linear motors as an AC linear motor set, comprising: driving current supply parts provided corresponding to the respective AC linear motors for supplying excitation current to coils of the AC linear motors; a protecting/monitoring part containing a current comparator for comparing phase currents of the AC linear motors; and a control command part for generating a command signal to output to the driving current supply parts based on a signal generated by the protecting/monitoring part and a feedback signal from a master AC linear motor when one of the AC linear motors is set to the master AC linear motor.

It is preferable that the protecting/monitoring part further includes a voltage comparator for comparing primary voltages of the driving current supply parts. It is preferable that the current comparator has an operational amplifier and a comparator.

Effects of the Invention

According to the present invention, the plural AC linear motors of identical specifications are connected to each other and operated simultaneously so that the plural-linear-motor set having desired power can be controlled like a single linear motor.

BRIEF DESCRIPTION OF THE DRAWINGS

FIGS. 8 (a) and (b) are views showing compared current profiles of phase currents and voltage profiles of bus voltages in the protecting/monitoring part.

REFERENCE NUMERALS

1 base member, 2 raceway rail, 3 slide table, 4 AC linear synchronous motor, 5 slide block, 6 table plate, 40 stator magnet, 41 excitation coil, 100 linear motor driving device (AC linear motor driving device, or device for driving AC linear motors), 101 driving current supply part for supplying driving current to AC linear synchronous motor (inverter), 102 protecting/monitoring part, 103 control command part

BEST MODES FOR CARRYING OUT THE INVENTION

Figure 1:
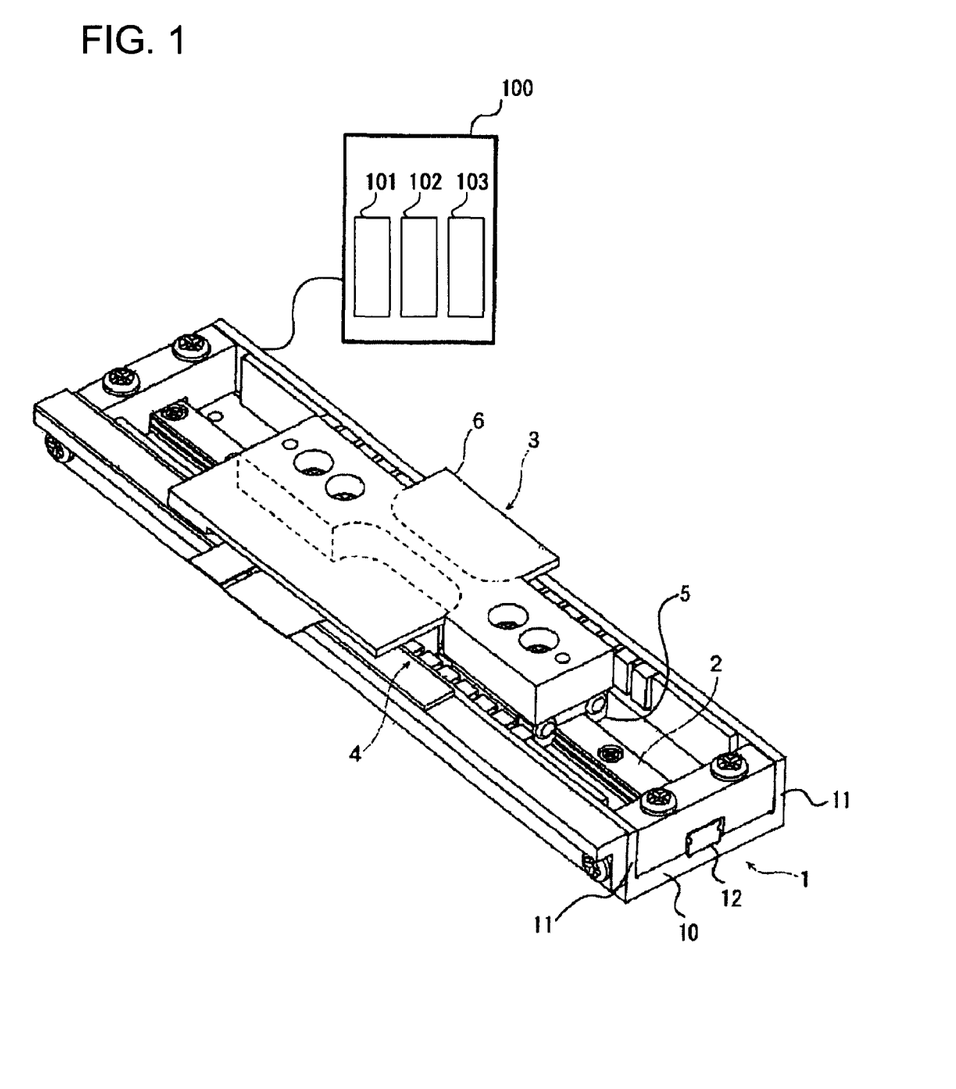
FIG. 1 is a perspective view showing an example of a linear motor actuator.

FIG. 1 is a perspective view of a linear motor actuator using one AC linear synchronous motor. In this embodiment, the linear motor applied here is an AC linear synchronous motor, however, it is not limited to the synchronous motor.

The linear motor actuator has a base member 1, a raceway rail 2 laid on this base member 1, a slide table 3 movable to and fro along the raceway rail 2, an AC linear synchronous motor 4 moving the slide table 3 on the base member 1, and an AC linear motor driving device 100.

The base member 1 included in the linear motor actuator has a bottom plate 10 and a pair of side walls 11, 11 provided standing on both sides of this bottom plate 10, and the base member 1 takes a shape of a channel. On the base plate 10, a mounting groove 12 is formed in the longitudinal direction of the base member 1 for positioning the raceway rail 2.

Besides, the slide table 3 has a slide block 5 moving along the raceway rail 2 and a table plate 6 fixed on the slide block 5.

Figure 2:
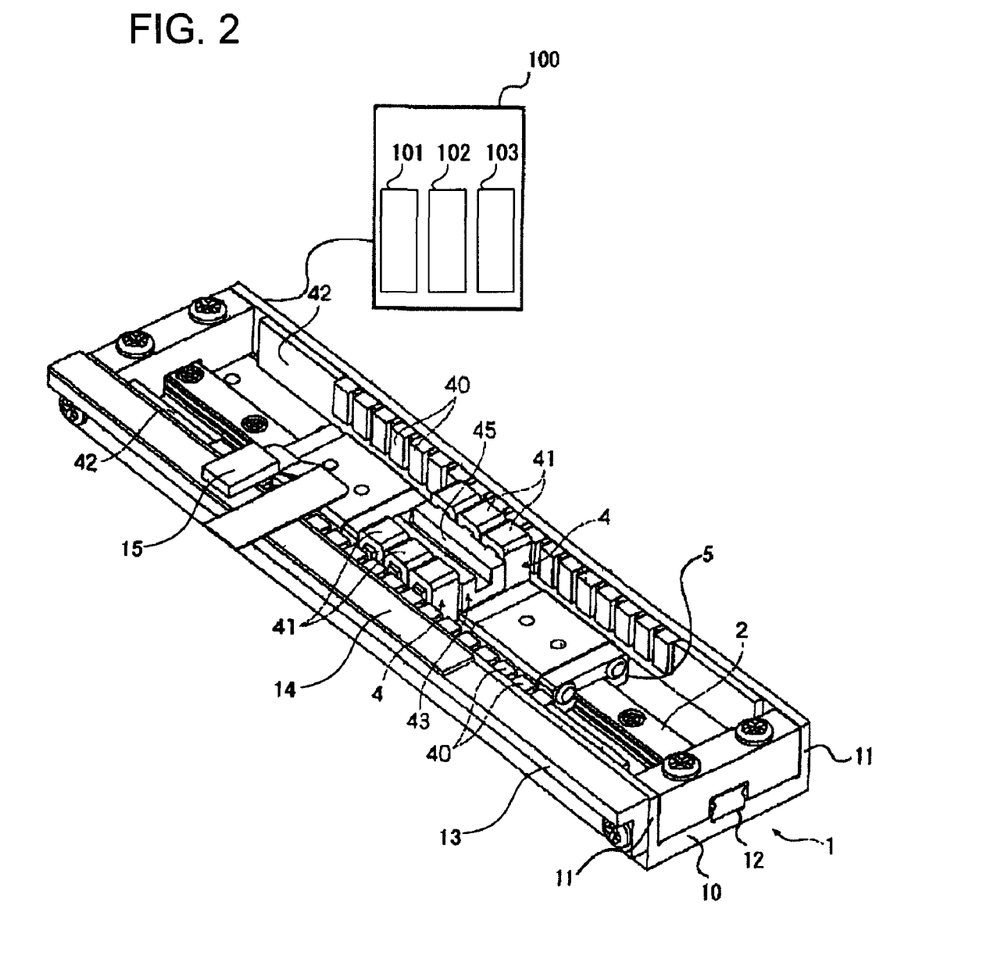
FIG. 2 is a perspective view showing the linear motor actuator of FIG. 1 from which a table plate is removed.

FIG. 2 is a perspective view of the linear motor actuator of FIG. 1 form which the table plate 6 is removed. The slide block 5, together with the raceway rail 2, makes up a linear guide for guiding the table plate 6 along the raceway rail 2.

An output (power) of the AC linear synchronous motor 4 is determined by the magnitude of a load put on the slide table 3. Generally, the power of the AC linear synchronous motor 4 is determined by a repulsive force of a magnetic field generated at the magnetic pole of a mover (which is expressed as an AC linear synchronous motor 4 here) by the driving current passing through the coils of the motor against plural stator magnets 40 arranged in a line on each side wall 11 of the base member 1.

On each of the side walls 11 of the base member 1, stator magnets 40 are arranged in such a manner that n poles and s poles face the excitation coils 41 alternately. These stator magnets 40 are arranged on a holding plate 42 made of synthetic resin. The holding plate 42 is bonded to an inner surface of each side wall 11 of the base member 1 so that the stator magnets 40 can be easily arranged on the base member 1. Further, the stator magnets 40 are formed integral with the holding plate 42 by injection molding of the holding plate 42.

Furthermore, the excitation coils 41 are formed by winding coils on a core member of ferromagnet such as iron. In this linear motor actuator, the paired excitation coils 41, 41 are arranged facing the stator magnets 40 arranged on the respective side walls 11 of the base member 1, but in the example shown in FIG. 2, these paired excitation coils 41, 41 are formed with the one core plate 43.

Figure 3:
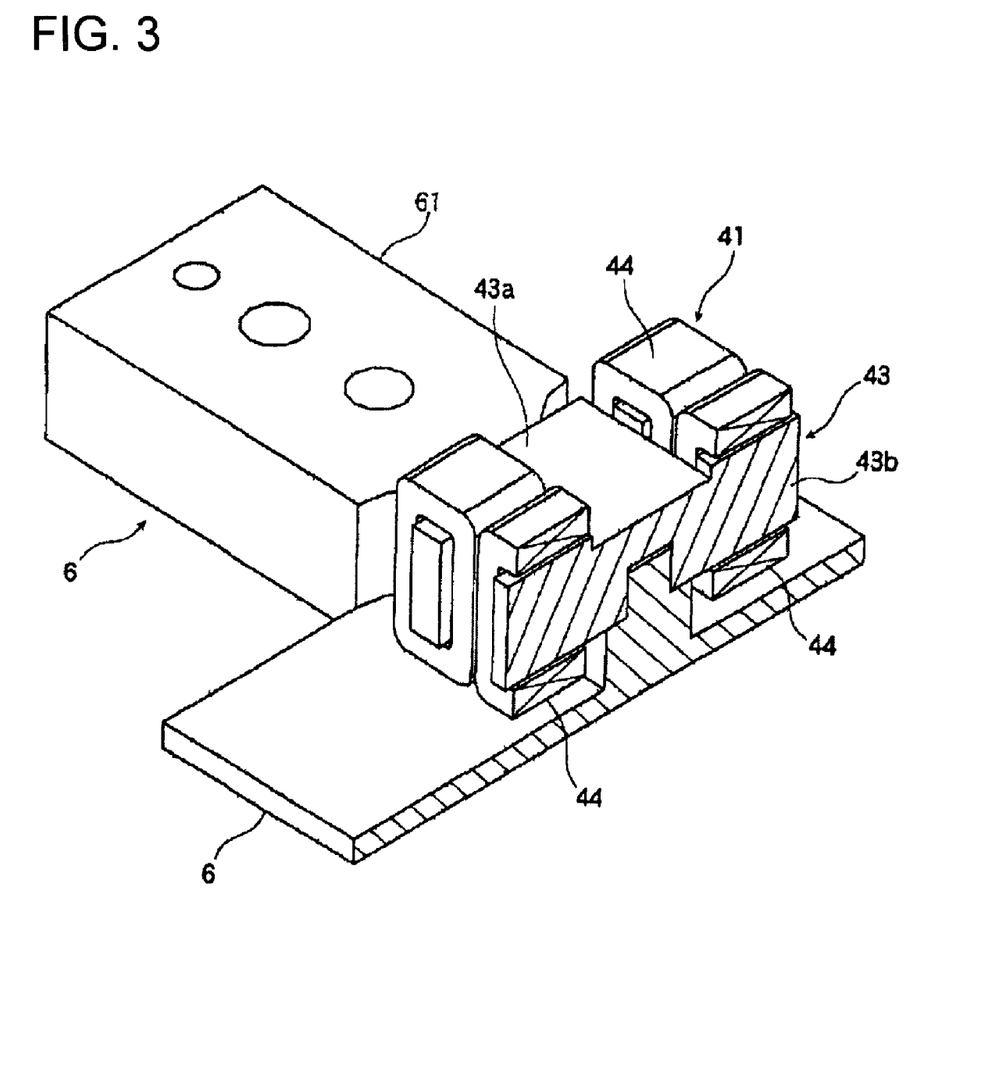
FIG. 3 is a perspective view showing connection between excitation coils and the table plate (including a cross sectional view of the excitation coil structure)

FIG. 3 is a perspective view showing connection between the excitation coils 41 and the table plate 6, also showing the cross section of the excitation coils 41. The excitation coils 41 are formed of coils 44 wound on the core plate 43. This core plate 43 has a center part 43a connected to the table plate 6, and a pair of core parts 43b, 43b positioned at respective sides of this center part 43*a*. In each of the core parts 43*b*, a slot is formed for accommodating the coils 44.

Specifically, the coils 44 are wound on respective core parts 43*b*, which make up the paired excitation coils 41 integrated by the core plate 43. Each excitation coil 41 has three-phase coils 44 of u phase, v phase and w phase. When three-phase AC current supplied from the AC linear motor driving device 100 is applied to the coils 44, power is generated on the excitation coil 41 along the arrangement direction of the stator magnets 40.

In FIG. 2, a bracket 13 having an approximately L-shaped cross section is fixed to one side wall of the base member 1. On the upper surface of this bracket 13, a linear scale 14 is attached along the longitudinal direction of the base member 1. Besides, on the bottom surface of the table plate 6, an encoder 15 is fixed for reading the linear scale 14 in accordance with the moving of the table plate 6 to output pulse signals at intervals in accordance with moving speeds of the table plate 6.

The current passage through the excitation coils 41 and transmission of output signals of the encoder 15 are realized by using flexible printed wiring boards, and they are fixed to the bottom surface of the table plate 6 and their leads are extended out toward the base member 1 and connected to the AC linear motor driving device 100.

As described above, in the thus-structured linear motor actuator, when the three-phase AC current passes through the excitation coils 41 fixed to the table plate 6, power is generated on the excitation coils 41 along the arrangement direction of the stator magnets 40 so that the slide table 3 moves along the raceway rail 2. The encoder 15 reads the linear scale 14 and outputs a signal in accordance with the moving distance and speed of the slide table 3. Hence, the to and fro movement of the slide table 3 can be controlled freely by controlling the current passing through the excitation coils 41 with reference to the output signal from the encoder 15.

The linear motor actuator gives to and fro movement as described above, however, sometimes it is difficult to achieve the required power with the AC linear synchronous motor manufactured in lines under standards for some load of the linear motor actuator. In such a case, AC linear synchronous motors within specifications are combined and controlled as follows so as to produce an AC linear synchronous motor that meets the required power for movement control.

Figure 4:
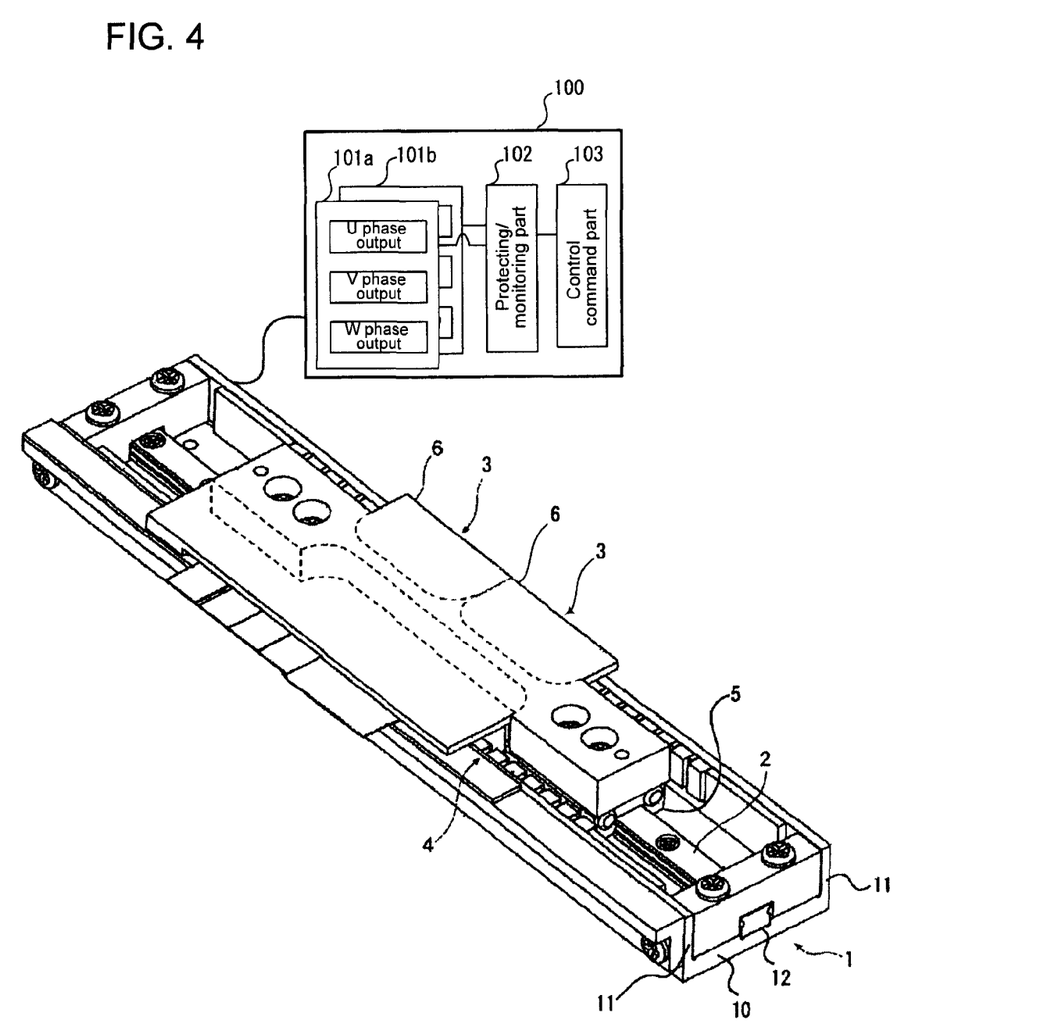
FIG. 4 is a perspective view showing a linear motor actuator having two AC linear synchronous motors of identical specifications.
Figure 5:
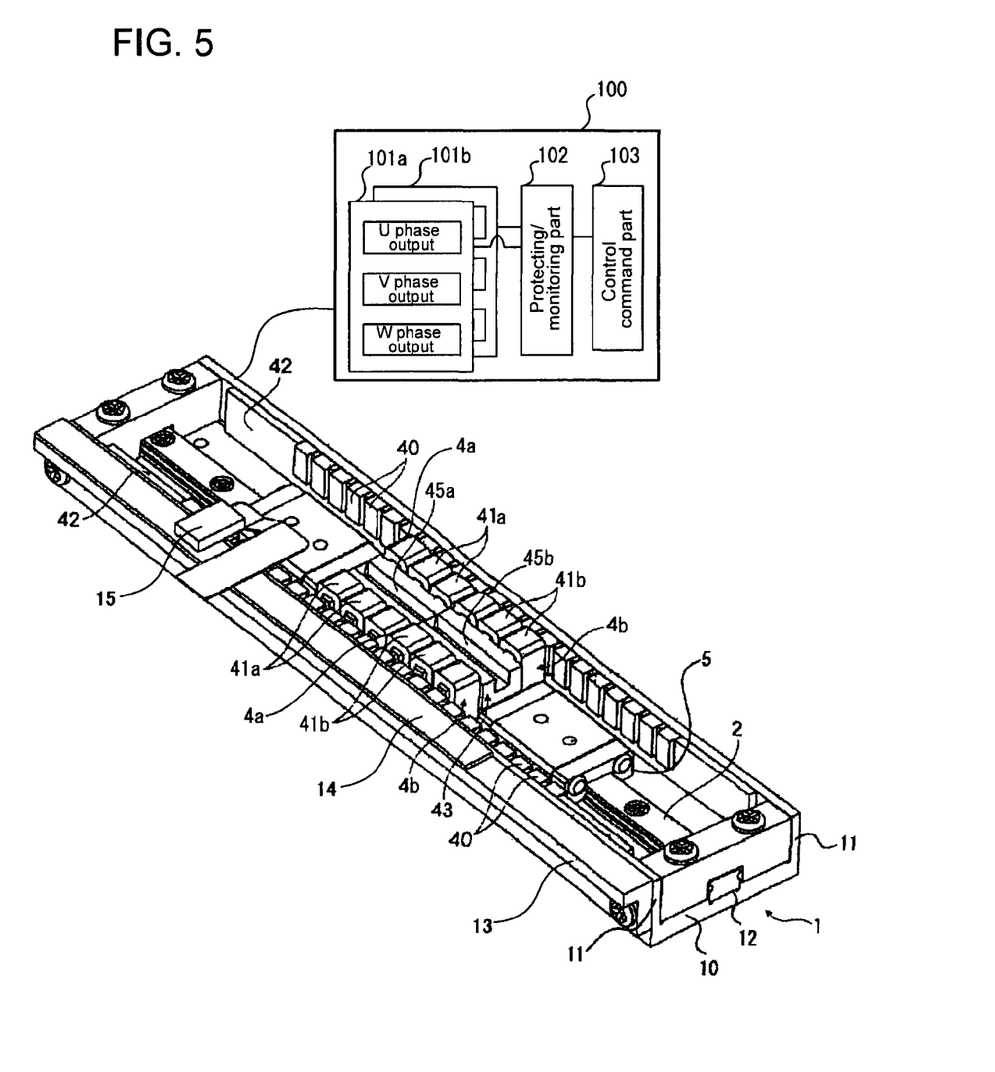
FIG. 5 is a perspective view showing the linear motor actuator of FIG. 4 from which the table plate is removed.

FIG. 4 is a perspective view showing a linear motor actuator having two AC linear synchronous motors of identical specifications connected to each other, and FIG. 5 is a perspective view showing the linear motor actuator of FIG. 4 from which the table plate 6 is removed. In this embodiment, the two AC linear synchronous motors are applied, however, three or more motors may be applied, and the linear motors are not limited to the AC linear synchronous motors.

AC linear synchronous motors 4*a* and 4*b* of identical specifications (same standards) are connected to the table plate 6 firmly without looseness by screws or the like. Here, the two AC linear synchronous motors are connected in such a manner that the distance between the excitation coils 41*a* of the AC linear synchronous motor 4*a* and the excitation coils 41*b* of its adjacent AC linear synchronous motor 4*b* becomes the same as a pitch of the excitation coils 41 (pitch of magnetic poles generated u, w and v phases).

When the two AC linear synchronous motors are connected in this way, the magnetic poles (u, w, v, u, w, v phases) generated by the excitation coils 41*a*, 41*b* of the linear synchronous motors 4 as movers correspond in a one-to-one relationship to stator magnets 40 thereby to achieve a linear motor actuator having power on the excitation coils 41 along the arrangement direction of the stator magnets 40 (this power is, at the maximum, twice as large as the power of the linear motor actuator having only one AC linear synchronous motor).

The slide block 5, together with the raceway rail 2, makes up the linear guide for guiding the table plate 6 along the raceway rail 2. As shown in FIG. 5, the excitation coils 41*a* of the AC linear synchronous motor 4*a* and the excitation coils 41*b* of the AC linear synchronous motor 4*b* are arranged continuously with the same magnet pitch maintained thereby to form a set of AC linear synchronous motors.

The current passage through the excitation coils 41*a*, 41*b* and transmission of output signals of the encoder 15 are realized by using printed wiring boards, which are fixed to the bottom surface of the table plate 6. Leads therefrom are extended out toward the base member 1 and connected to the AC linear motor driving device 100.

In the thus-structured linear motor actuator, any one of the two AC linear synchronous motors is used as a main AC linear synchronous motor (master linear motor) and the other is used as a slave linear motor. When the three-phase AC current passes through the excitation coils 41*a*, 41*b* fixed to the table plate 6, power is generated on the excitation coils 41*a*, 41*b* along the arrangement direction of the stator magnets 40 and the slide table 3 moves along the raceway rail 2.

Here, the encoder 15 reads the linear scale 14 and outputs a signal in accordance with the moving distance and speed of the slide table 3 of the master AC linear synchronous motor 4*a*, and therefore, the output signal from the encoder 15 is used as a reference to feed a signal regarding the position and speed information and the like back to the AC linear motor driving device 100.

Figure 6:
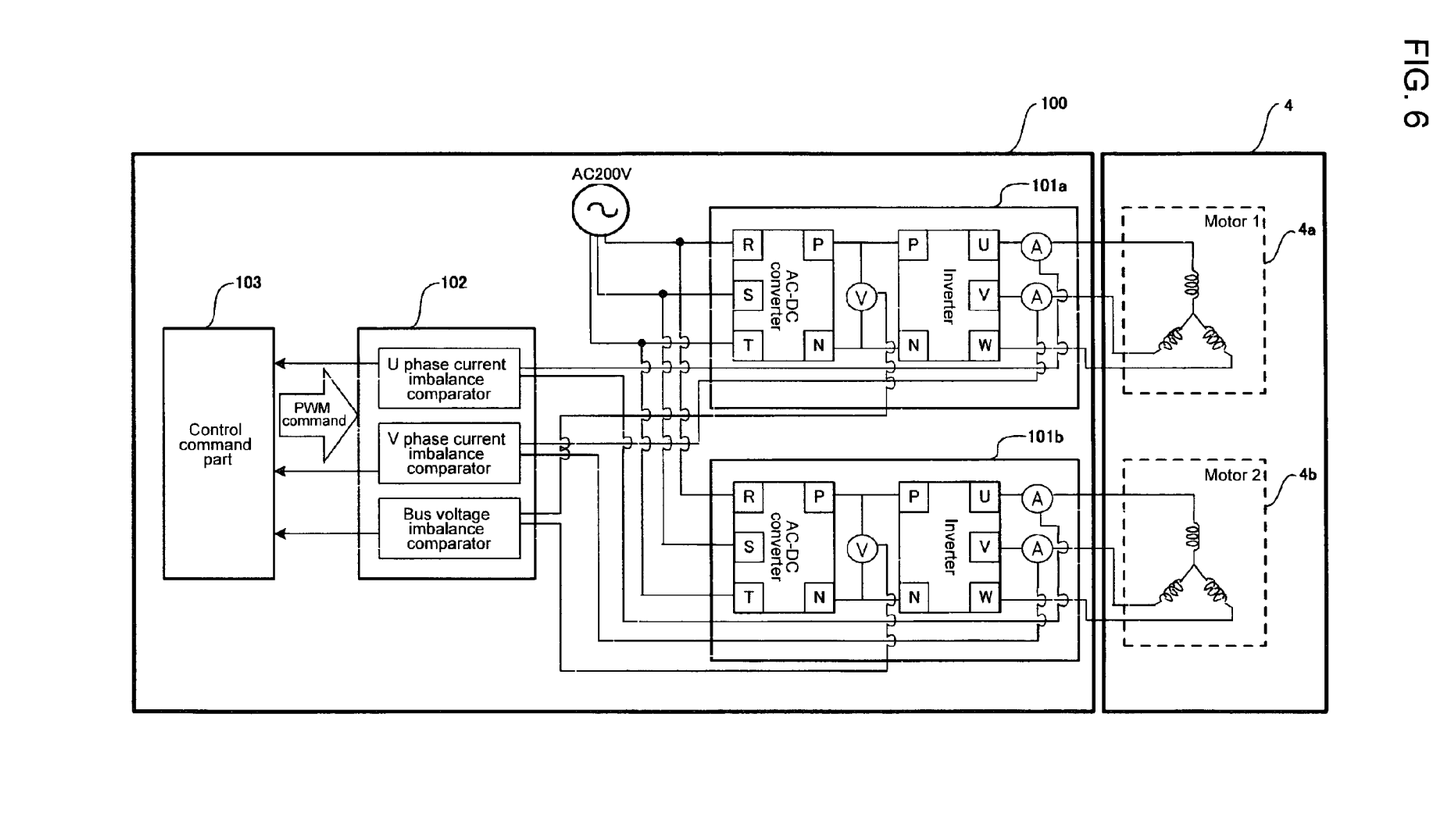
FIG. 6 is a block diagram of a linear motor driving device.

The linear motor driving device 100 is for controlling the connected two AC linear synchronous motors simultaneously based on the signal feedbacked from the encoder 15. FIG. 6 is a block diagram of the linear motor driving device, which has a driving current supply part 101 for supplying driving current to each AC linear synchronous motor (which is an inverter, here), a protecting/monitoring part 102 and a control command part 103. The driving current supply part 101 is provided for each AC linear synchronous motor, and the driving current supply part 101*a* corresponds to the AC linear synchronous motor 4*a* and the driving current supply part 101*b* corresponds to the AC linear synchronous motor 4*b*. Meanwhile, as to the protecting/monitoring part 102 and the control command part 103, one protecting/monitoring part 102 and one control command part 103 operate for all of the AC linear synchronous motors.

The protecting/monitoring part 102 is structured to have a u phase current imbalance comparator and a v phase current imbalance comparator for comparing u phase and v phase currents of the AC linear synchronous motors 4*a* and 4*b* that are output currents of the driving current supply parts 101*a* and 101*b*, and a bus voltage imbalance comparator for comparing bus voltages which are primary voltages of the driving current supply parts 101*a* and 101*b*. Here, the phase currents as comparison target may be at least any two of u, v and w phase currents and the one current not selected for comparison can be obtained by theoretical calculation.

The control command part 103 generates a command signal for controlling movement of the AC linear synchronous motors 4 based on a protection/monitor signal from the protecting/monitoring part 102 and the feedback signal from the encoder 15.

Figure 7:
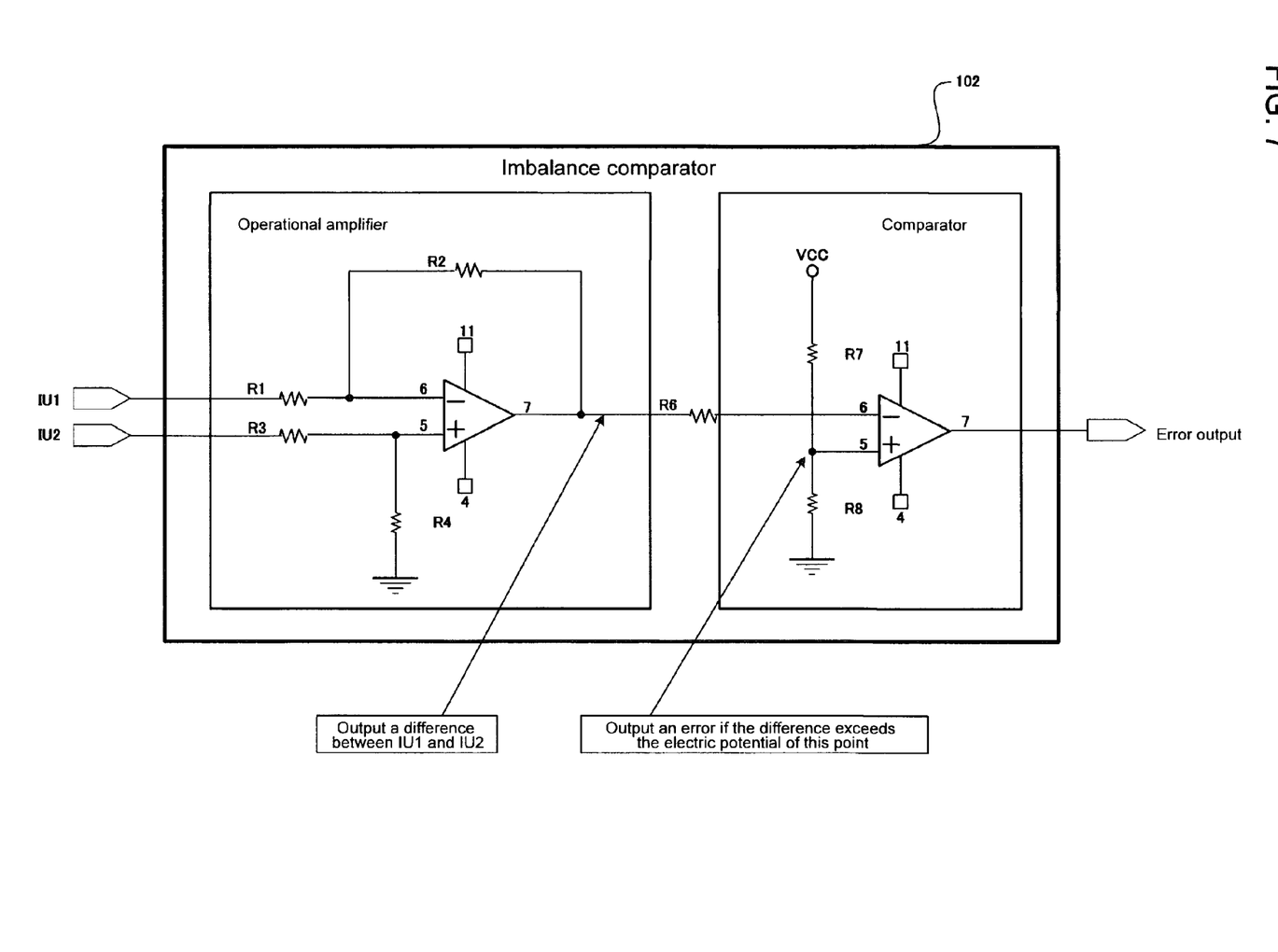
FIG. 7 is a detail view of a U phase current imbalance comparator of a protecting/monitoring part.

FIG. 7 is a detail view of the u phase imbalance comparator of the protecting/monitoring part 102, which imbalance comparator has an analogue operational amplifier and a comparator. Receiving the u phase current (IU1) of the AC linear synchronous motor 4a and the u phase current (IU2) of the AC linear synchronous motor 4b, the analogue operational amplifier outputs a difference value or difference ratio between IU1 and IU2 from their different current profiles. This difference value or difference ratio is input to the comparator, which compares this difference value or ratio with a preset value or ratio and, when the difference value or ratio exceeds the preset value or ratio, the comparator outputs an error signal. Here, in this embodiment, the difference ratio of current profiles is output as a threshold value. Besides, an error signal is set to be output when the difference ration of the current profiles exceeds 30%, thereby allowing excellent movement control.

The error signal output from the protecting/monitoring part 102 is output to the control command part 103, which outputs a command signal to stop the AC linear synchronous motor.

Figure 8A:
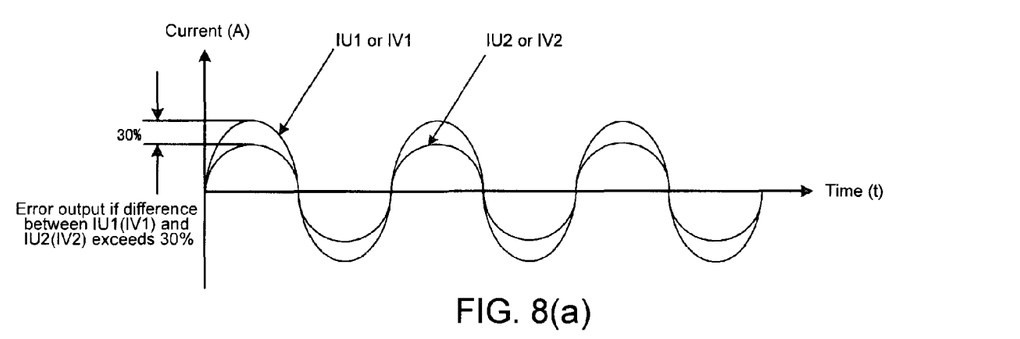
Figure 8B:
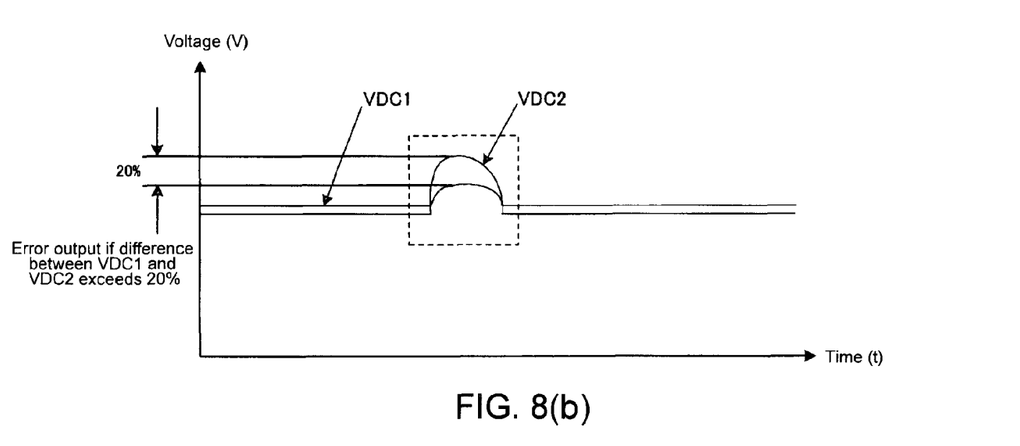

FIGS. 8(a) and 8(b) are views showing comparison of the bus voltages and phase current profiles in the protecting/monitoring part 102. FIG. 8(a) shows imbalance comparison of the current profiles in the analogue operational amplifier of the u phase current (IU1) of the AC linear synchronous motor 4a and the u phase current (IU2) of the AC linear synchronous motor 4b.

As the AC linear synchronous motors 4a and 4b are of identical specifications, identical pole pitches and identical command signals output to the driving current supply parts, the current profiles to be compared in the comparator of the protecting/monitoring part 102 must be the same. However, the motor coils become deteriorated due to change over time, the current profiles become different from each other as shown in FIG. 8(a). Further, when connection of the AC linear synchronous motors becomes loose for some reason and the pole pitch and pole interval (between 4a and 4b) of the adjacent movers are shifted, the current phases become different. Then, the threshold value of difference ratio of the currents IU1 and IU2 is set at 30% and if it exceeds 30%, an error signal is output to the control command part 103 thereby to realize safe movement of the two AC linear synchronous motors.

FIG. 8(b) shows the bus voltage imbalance comparator monitoring bus voltages as primary voltages of the driving current supply parts 101a and 101b. The bus voltage imbalance comparator monitors, as DC voltages, the driving currents supplied to be the AC linear synchronous motors 4a and 4b. When the AC linear synchronous motors 4a and 4b reduce speed, the back electromotive force is returned to the power source as regenerative energy, which causes increase in the bus voltage. Such increase in bus voltage due to regenerative energy is common to the AC linear synchronous motors 4a and 4b, however due to mounting failure such as mismatch between the pole interval between adjacent movers and pole pitch in mounting of the AC linear synchronous motors, loose connection, time-varying excitation coil deterioration or the like, the regenerative energy of the VDC1 may become a large back electromotive force such as VDC2 and be regenerated.

In such cases, when the increase in bus voltage of the regenerative energy of a part of the AC linear synchronous motors is large, the coils of the AC linear synchronous motor may burn out and it may be difficult to control the plural AC linear synchronous motors. The comparator monitors this and outputs an error signal to the control command part 103 when the difference of bus voltages exceeds 20%, for example. Then, it stops the AC linear synchronous motors 4a, 4b thereby to be able to prevent burnout of the motor coils.

As the phase currents of the AC linear synchronous motors 4a and 4b and bus voltages of the driving current supply parts 101a and 101b are monitored, double protection is made thereby to allow sage control of the two AC linear synchronous motors of the same specifications.

The present specification is based on Japanese Patent Application No. 2006-268804 filed on Sep. 29, 2006, the entire contents of which are expressly incorporated by reference herein.

The invention claimed is:

1. A method for controlling, as an AC linear motor set, a plurality of AC linear motors of identical specifications which are connected to each other, comprising:

firmly connecting the AC linear motors in such a manner that pole pitches of movers of the AC linear motors and pole intervals of adjacent movers are identical; and setting any one of the AC linear motors to be a master AC linear motor and using a command signal generated based on a feedback signal of the master AC linear motor and current difference information obtained by comparing phase current of the master AC linear motor with phase current of another AC linear motor to control the AC linear motor set.

2. The method of claim 1, wherein comparison of the phase currents is comparison of current profiles by an operational amplifier and a comparator and the current difference information is a difference ratio of the current profiles.

3. The method of claim 1, wherein the AC linear motor set is controlled with voltage difference information obtained by comparing a primary line voltage of a driving current supply part for supplying excitation current to coils of the master AC linear motor and a primary line voltage of another driving current supply part.

4. The method of claim 1, wherein the feedback signal contains an average of the primary line voltages of the driving current supply parts.

5. A system having a plurality of AC linear motors of identical specifications which are connected to each other and controlled as an AC linear motor set, comprising:

the AC linear motors being firmly connected each other in such a manner that pole pitches of movers of the AC linear motors and pole intervals of adjacent movers are identical; and an AC linear motor driving device having driving current supply parts provided corresponding to the respective AC linear motors for supplying excitation current to coils of the AC linear motors, a protecting/monitoring part containing a current comparator for comparing phase currents of the AC linear motors and a control command part for generating a command signal to output the signal to the driving current supply parts based on a signal generated by the protecting/monitoring part and a feedback signal from a master AC linear motor when one of the AC linear motors is set to the master AC linear motor.

6. The system of claim 5, wherein the protecting/monitoring part further includes a voltage comparator for comparing primary voltages of the driving current supply parts.

7. The system of claim 5, wherein the current comparator has an operational amplifier and a comparator.

8. The system of claim 5, wherein the protecting/monitoring part includes a voltage comparator having a unit for obtaining an average of primary line voltages of the driving current supply parts and supplying the average as the feedback signal to the control command part.

9. A device for driving a plurality of AC linear motors of identical specifications which are firmly connected each other in such a manner that pole pitches of movers of the AC linear motors and pole intervals of adjacent movers are identical to control the AC linear motors as an AC linear motor set, comprising:

driving current supply parts provided corresponding to the respective AC linear motors for supplying excitation current to coils of the AC linear motors;

a protecting/monitoring part containing a current comparator for comparing phase currents of the AC linear motors; and a control command part for generating a command signal to output to the driving current supply parts based on a signal generated by the protecting/monitoring part and a feedback signal from a master AC linear motor when one of the AC linear motors is set to the master AC linear motor.

10. The device of claim 9, wherein the protecting/monitoring part further includes a voltage comparator for comparing primary voltages of the driving current supply parts.

11. The device of claim 9, wherein the current comparator has an operational amplifier and a comparator.

* * * * *